(12) United States Patent
Watanabe et al.

(10) Patent No.: US 10,366,724 B2
(45) Date of Patent: Jul. 30, 2019

(54) STORAGE CONTROL DEVICE, STORAGE SYSTEM AND METHOD OF CONTROLLING A STORAGE DEVICE

(71) Applicant: FUJITSU LIMITED, Kawasaki-shi, Kanagawa (JP)

(72) Inventors: Takeshi Watanabe, Kawasaki (JP); Chikashi Maeda, Kawasaki (JP); Kazuhiro Urata, Kawasaki (JP); Yukari Tsuchiyama, Kawasaki (JP); Guangyu Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 15/395,890

(22) Filed: Dec. 30, 2016

(65) Prior Publication Data
US 2017/0263284 A1 Sep. 14, 2017

(30) Foreign Application Priority Data
Mar. 9, 2016 (JP) .................................. 2016-046200

(51) Int. Cl.
*G06F 3/06* (2006.01)
*G11B 20/18* (2006.01)
*G11C 29/00* (2006.01)

(52) U.S. Cl.
CPC ........ *G11B 20/1816* (2013.01); *G06F 3/0604* (2013.01); *G06F 3/0619* (2013.01); *G06F 3/0644* (2013.01); *G06F 3/0689* (2013.01); *G11B 2020/1826* (2013.01)

(58) Field of Classification Search
CPC .... G06F 3/0604; G06F 3/0619; G06F 3/0689; G06F 3/0644; G11B 2020/1826; G11B 20/1816
See application file for complete search history.

(56) References Cited

U.S. PATENT DOCUMENTS

| 5,105,427 A | * | 4/1992 | Ando ..................... G11B 20/18 714/710 |
| 5,235,585 A | * | 8/1993 | Bish ................... G11B 20/1833 369/53.17 |
| 5,666,336 A | * | 9/1997 | Yoshida ............. G11B 7/08505 369/30.11 |

(Continued)

FOREIGN PATENT DOCUMENTS

| JP | 9-259538 | 10/1997 |
| JP | 2007-241896 | 9/2007 |
| JP | 2010-146495 | 7/2010 |

*Primary Examiner* — Guy J Lamarre
(74) *Attorney, Agent, or Firm* — Staas & Halsey LLP

(57) ABSTRACT

A storage control device configured to control a storage device including a plurality of groups each of which includes a plurality of storage regions, the storage control device includes a memory and a processor coupled to the memory and configured to store, into the memory, information associated with each of the plurality of groups and indicating whether an error region in which an error is detected is included in at least one of the plurality of storage regions of each of the plurality of groups, identify a first group including the error region from the plurality of groups based on the information associated with the plurality of groups, read data from a plurality of storage regions included in the identified first group, and identify the error region included in the first group based on the read data.

12 Claims, 12 Drawing Sheets

(56) References Cited

U.S. PATENT DOCUMENTS

| | | | |
|---|---|---|---|
| 5,956,309 A | 9/1999 | Yamamuro | |
| 6,436,725 B2* | 8/2002 | Sakata | G11C 29/785 438/14 |
| 2005/0111315 A1* | 5/2005 | Hwang | G11B 7/00375 369/47.14 |
| 2007/0021963 A1* | 1/2007 | Deng | G06F 11/1441 711/103 |
| 2007/0214310 A1 | 9/2007 | Ishimoto et al. | |
| 2009/0198887 A1* | 8/2009 | Watanabe | G06F 11/1076 711/114 |
| 2010/0161937 A1 | 6/2010 | Tanaka | |
| 2012/0185754 A1* | 7/2012 | Estakhri | G06F 3/0616 714/773 |
| 2013/0021860 A1* | 1/2013 | Shvydun | G11C 29/4401 365/200 |
| 2013/0301369 A1* | 11/2013 | Shvydun | G11C 29/4401 365/200 |

\* cited by examiner

FIG. 6
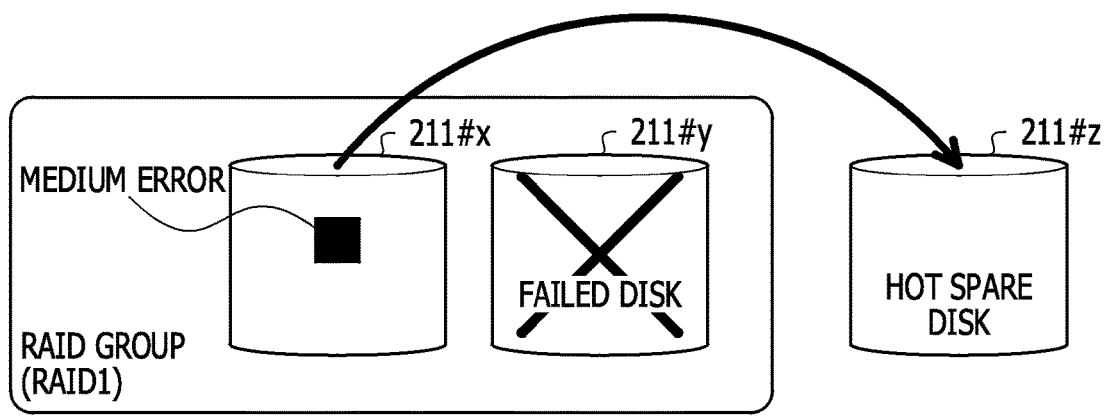
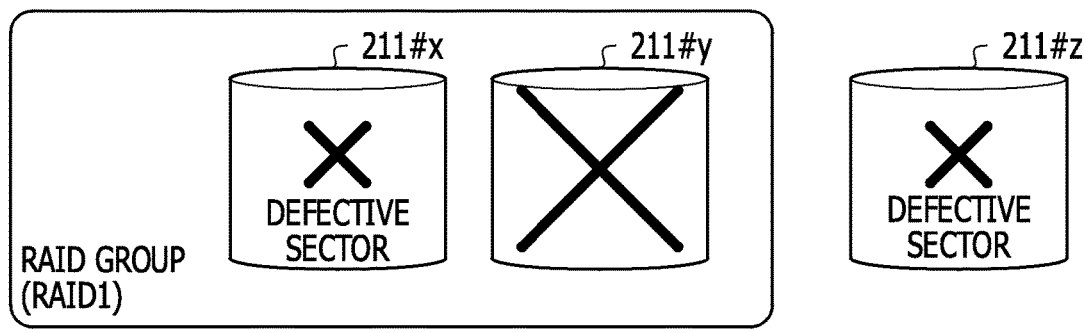

STORAGE CONTROL DEVICE, STORAGE SYSTEM AND METHOD OF CONTROLLING A STORAGE DEVICE

CROSS-REFERENCE TO RELATED APPLICATION

This application is based upon and claims the benefit of priority of the prior Japanese Patent Application No. 2016-046200, filed on Mar. 9, 2016, the entire contents of which are incorporated herein by reference.

FIELD

The embodiment discussed herein is related to a storage control device, a storage system and a method of controlling a storage device.

BACKGROUND

Traditionally, there has been a technique for storing the position of a sector in a memory of a storage control device if an error occurs from the sector that is the minimum access unit within a memory device.

As a related conventional technique, a controller, which manages a nonvolatile memory based on management information including a basic table for collectively managing a plurality of blocks and including differential information between the blocks, uses the differential information to manage different portions of the blocks within a collected range. In addition, there is a technique for treating, as alternate blocks, a predetermined number of blocks among a plurality of blocks and replacing a block including a sector with a secondary defect with an alternate block on a block basis when data is to be continuously recorded on sectors of a recording medium. Furthermore, there is a technique for calculating first physical addresses based on information of a second block storing an initially defective block among a plurality of first blocks to which the first physical addresses that do not overlap each other are assigned, information of a third block storing a subsequently defective block, and logical addresses. Related-art documents are Japanese Laid-open Patent Publications Nos. 2007-241896, 9-259538, and 2010-146495.

SUMMARY

According to an aspect of the invention, a storage control device configured to control a storage device including a plurality of groups each of which includes a plurality of storage regions, the storage control device includes a memory and a processor coupled to the memory and configured to store, into the memory, information associated with each of the plurality of groups and indicating whether an error region in which an error is detected is included in at least one of the plurality of storage regions of each of the plurality of groups, identify a first group including the error region from the plurality of groups based on the information associated with the plurality of groups, read data from a plurality of storage regions included in the identified first group, and identify the error region included in the first group based on the read data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating an example of the creation of a defective sector in a rebuild process.

DESCRIPTION OF EMBODIMENT

According to the conventional techniques, the storage capacity of a memory that is to be consumed for management information to be used to manage an error region in storage may increase. Specifically, as a storage region of the storage is increased, the storage capacity of the memory that is to be consumed for the management information increases. The storage capacity of the memory that is to be consumed for the management information may exceed the storage capacity of the memory included in a storage control device.

An embodiment of a storage control device disclosed herein, a storage control method disclosed herein, and a storage control program disclosed herein is described in detail with reference to the accompanying drawings.

Figure 1:
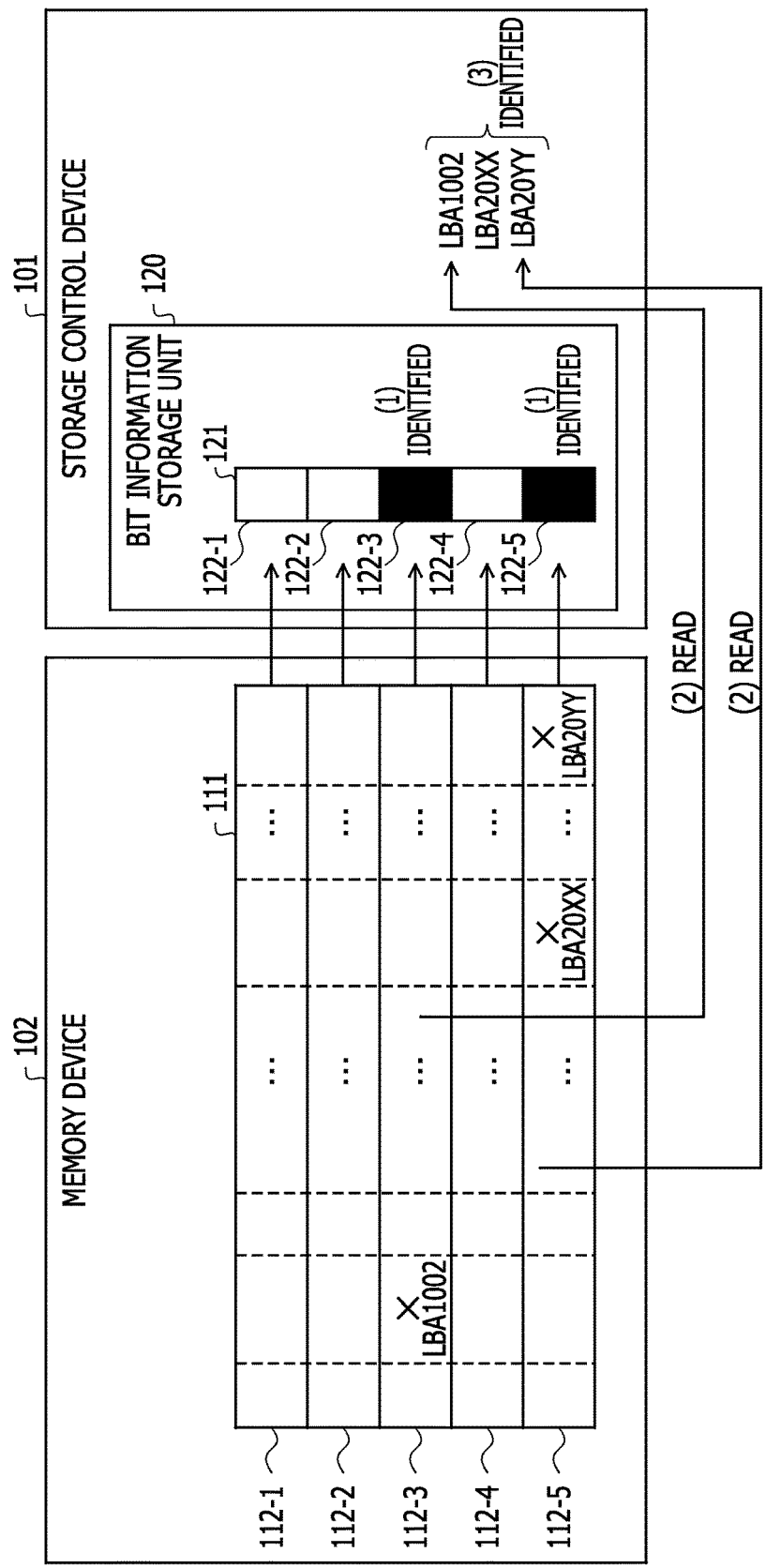
FIG. 1 is an explanatory diagram illustrating an example of operations of a storage control device 101 according to an embodiment.

FIG. 1 is an explanatory diagram illustrating an example of operations of a storage control device 101 according to the embodiment. The storage control device 101 is a computer that controls storage regions of memory devices 102. For example, the storage control device 101 controls the storage regions of the multiple memory devices 102 and provides, to a user, virtual volumes formed by RAID groups based on a Redundant Arrays of Inexpensive Disks (RAID) technique.

The RAID technique is a technique for combining the multiple memory devices 102 and operating the multiple memory devices 102 as virtual volumes. RAID levels that indicate how virtual disks are formed exist. The RAID levels from RAID 0 to RAID 6 exist. For RAID, levels, each of which is obtained by combining multiple RAID levels, exist and are RAID 0+1 and the like. The embodiment is applicable to cases where the RAID levels are used.

The memory devices 102 may arbitrary memory devices as long as each of the memory devices 102 has a nonvolatile storage medium. For example, as the memory devices 102, hard disk drives (HDDs), solid state drives (SSDs), optical disc drives, or the like may be used.

It is assumed that one of memory devices 102 that form a RAID group and are included in storage fails. In this case, the storage control device 101 executes a rebuild process and restores redundancy. Specifically, the storage control device 101 restores data stored in the failed memory device 102 to a memory device 102 replaced with the failed memory device 102 or to a memory device 102 set as a hot spare.

As details of the rebuild process, the storage control device 101 reads data from another memory device 102 that is included in the RAID group and is not the failed memory device 102, and the storage control device 101 restores the data stored in the failed memory device 102 based on the read data. A method of restoring the data stored in the failed memory device 102 based on the read data varies depending on the RAID level. For example, if the RAID level is 1, the read data is the data stored in the failed memory device 102. If the RAID level is 5, a value of the exclusive OR of data read from the memory devices 102 is the data stored in the failed memory device 102.

When data is read from a certain sector of another memory device 102 included in the RAID group during the rebuild process, the reading may fail due to a medium error of the certain sector or an error may occur. Sectors are the minimum access units of each memory device 102 and are regions into which a storage region of the memory device 102 is divided. A method of specifying addresses identifying the sectors is a logical block addressing (LBA) scheme, a cylinder head sector (CHS) scheme, or the like. The embodiment assumes that the method of specifying the addresses identifying the sectors is the LBA scheme.

A storage region identified by one logical block address (LBA) is the minimum unit region to be accessed by a host. Each sector may be identified by a respective LBA or may be identified by multiple LBAs. If each sector may be identified by a respective LBA, the size of each sector is equal to the size of a respective LBA or is 512 bytes, for example. If each sector may be identified by multiple LBAs, the size of each sector is equal to the size of four LBAs or is 2048 bytes, for example. An error region in which an error has occurred is referred to as a "defective sector". If the size of each sector is equal to the size of a respective LBA, a sector in which an error has occurred in the rebuild process and that is identified by one LBA is a defective sector. If the size of each sector is equal to the size of multiple LBAs, a sector in which an error has occurred in the rebuild process and that is identified by multiple LBAs is a defective sector.

Figure 7:
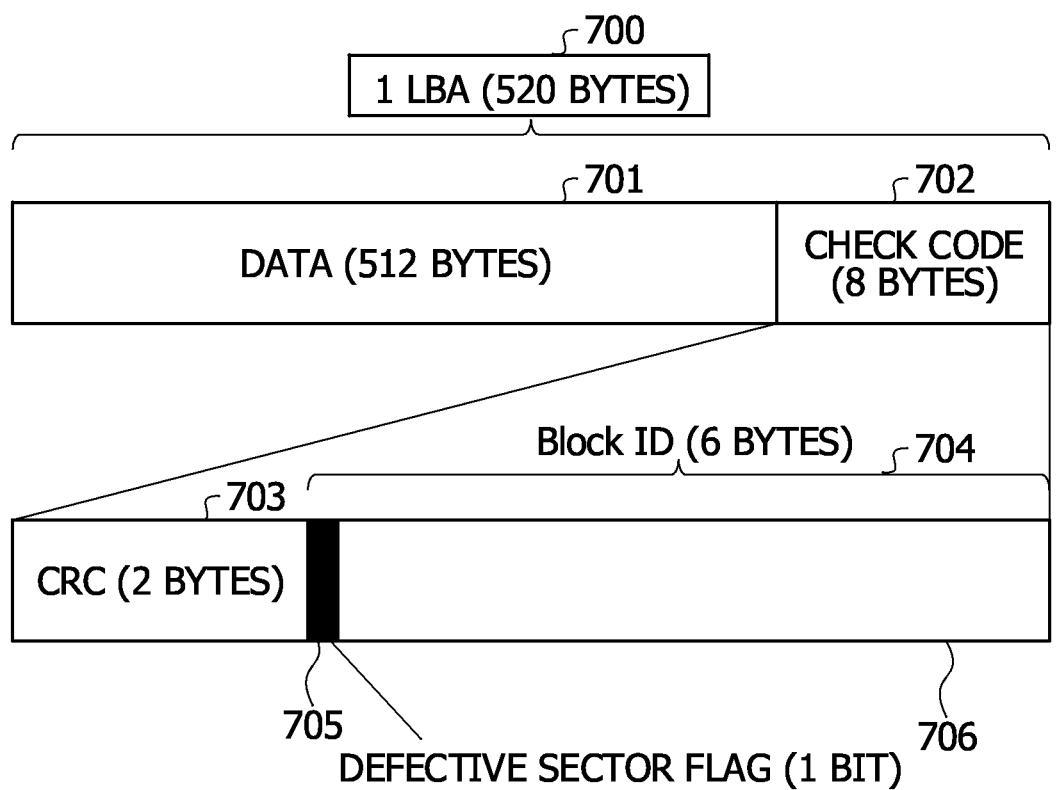
FIG. 7 is an explanatory diagram illustrating an example of each of defective sector flags provided in sectors.

If a defective sector has occurred, data stored in the defective sector is lost and the storage control device 101 initializes the data stored in the defective sector to 0 for a memory device 102 from which the data was read and a memory device 102 in which the restored data is scheduled to be written. In addition, the storage control device 101 sets, to be valid, information indicating whether or not the sector is a defective sector, and the storage control device 101 writes the set information in the sector. An example of the rebuild process is illustrated in FIG. 6. A specific data structure of each sector is illustrated in FIG. 7.

Hereinafter, information that is to be written in a sector and indicates whether or not the sector is a defective sector is referred to as a "defective sector flag". A defective sector flag of each sector is used to manage whether or not the sector is a defective sector. If a defective sector flag of a sector is invalid, the defective sector flag indicates that the sector is not a defective sector. If the defective sector flag of the sector is valid, the defective sector flag indicates that the sector is a defective sector.

If a defective sector has occurred, it is considered that the LBA of the defective sector is stored in a memory of the storage control device 101. A defective sector list is stored in the memory, a user of the memory devices 102 may easily browse a memory device 102 in which a defective sector exists, and the user of the memory devices 102 may easily browse an LBA at which the defective sector exists.

However, a storage capacity of the memory that is consumed for management information to be used to manage defective sectors in the storage may increase. Specifically, as the storage region of the storage is increased, the storage capacity of the memory that is consumed for the management information increases. Then, a large available region of the memory of the storage control device may be consumed or the storage capacity of the memory that is consumed for the management information may exceed the storage capacity of the memory of the storage control device 101. For example, if all defective sectors of 256 Tbytes are managed, an available capacity of 4 Tbytes (=256 (Tbytes)/512 (bytes/LBA)*8 (the size of one LBA)) is consumed.

In order to avoid consuming a large available region of the memory, it is considered that the number of defective sectors indicated in a list held on the memory for each of the memory devices 102 is a finite number or that up to a few defective sectors are indicated in the list held on the memory for each of the memory devices 102, for example. However, if defective sectors whose number exceeds the finite number has occurred, the defective sectors exist in a memory device 102, but locations at which the defective sectors exist in the memory device 102 are not clear or the memory device 102 becomes a so-called discrete state. In this case, if LBAs at which the defective sectors exist are clear, a device of the user who uses the memory device 102 may execute overwriting on the defective sectors and thereby delete the sectors subjected to the overwriting from the defective sector list held on the memory. However, even if the memory device 102 becomes the discrete state, and the defective sectors of the memory device 102 are deleted due to the overwriting executed on the defective sectors, it is not clear whether or not all the defective sectors of the memory device 102 are deleted, and at least any of the defective sectors may not be deleted from the defective sector list.

If the number of defective sectors indicated in the list for each of the memory devices 102 is increased, a possibility that the aforementioned state occurs is reduced, but the reduction is traded off against a consumed amount of the memory.

The embodiment describes a case where a group that includes a defective sector is identified from bits indicating whether or not a defective sector is included in groups within the storage regions of the memory devices 102, the identified group is read, and the defective sector is identified.

An example of operations of the storage control device 101 is described with reference to FIG. 1. In the example illustrated in FIG. 1, a single memory device 102 is illustrated in order to simplify the description. The memory device 102 illustrated in FIG. 1 is either a memory device 102 in which an error has occurred during the rebuild process or a memory device 102 in which restored data is scheduled to be written.

The storage control device 101 stores bit information items 122 in a bit information storage unit 120. The bit information items 122 are bits of groups 112 obtained by grouping LBAs logically assigned to storage assigned to a volume 111 and indicate whether or not a defective sector is included.

LBAs included in each of the groups 112 are arbitrary as long as the number of LBAs included in each of the groups 112 are two or more. For example, each of the groups 112 is a region obtained by dividing the volume 111 by a data length of two or more LBAs. Alternatively, each of the groups 112 may be obtained by grouping LBAs based on several lower bits of LBAs of the volume 111. The LBAs included in the groups 112, however, are read in a post-process. Thus, if the memory devices are HDDs with high sequential access performance and low random access performance, it is preferable that LBAs included in each of the groups 112 be continuous. In addition, a certain LBA may be included in multiple groups 112. However, the amount of the overall bit information items 122 increases and it is preferable that each LBA be included in only one group.

In the example illustrated in FIG. 1, each LBA is included in any of the five groups 112-1 to 112-5 obtained by dividing the volume 111 by the data length of two or more LBAs. In the example illustrated in FIG. 1, each of horizontally long rectangles surrounded by solid lines indicates a single group 112. In addition, each of rectangles surrounded by solid lines and broken lines indicates a single LBA. Furthermore, in the example illustrated in FIG. 1, the groups 112-1 to 112-5 are associated with bit information items 122-1 to 122-5. The group 112-3 includes an LBA 1002 of a defective sector, and the group 112-5 includes LBAs 20XX and 20YY of defective sectors. In the example illustrated in FIG. 1, the defective sectors are indicated by symbols x.

Since the groups 112-3 and 112-5 include the defective sectors, the bit information items 122-3 and 122-5 that are associated with the groups 112-3 and 112-5 have values indicating that the defective sectors are included in the associated groups. On the other hand, the bit information items 122-1, 122-2, and 122-4 that are associated with the groups 112-1, 112-2, and 112-4 have values indicating that a defective sector is not included in the associated groups. In the following description, a value that indicates that a defective sector is included in an associated group indicates "ON", and a value that indicates that a defective sector is not included in an associated group indicates "OFF". For example, if a bit value is 1, the bit value indicates ON. If the bit value is 0, the bit value indicates OFF. Alternatively, the bit value of 1 may indicate OFF, and the bit value of 0 may indicate ON. In the example illustrated in FIG. 1, bits set to ON are indicated in black.

In addition, a way in which the multiple bit information items 122 are stored on the memory of the storage control device 101 is arbitrary, but it is preferable that the multiple bit information items 122 be stored as a bit map from the perspective of the easiness of the management. The bit map is an array composed of the multiple bit information items 122. The array composed of the multiple bit information items 122 is referred to as a bit map 121. The bit map 121 serves as management information to be used to manage an error region in the storage. The order in which the bit information items 122 are arranged in the bit map 121 is arbitrary as long as associations between the bit information items 122 and the groups 112 are identified. For example, in order to make the management easy, the bit information items 122 included in the bit map 121 may be arranged in ascending or descending order of the LBAs included in the bit information items 122. In the example illustrated in FIG. 1, the bit information items 122 included in the bit map 121 are arranged in ascending order of the LBAs included in the bit information items 122. In a state in which a defective sector does not exist in the volume 111, it is pointless to hold the bit map 121. Thus, the storage control device 101 obtains the bit map 121 when a defective sector occurs for the first time.

As indicated by (1) in FIG. 1, the storage control device 101 references the bit map 121 stored in the bit information storage unit 120 and identifies a group including a defective sector from the volume 111. In the example illustrated in FIG. 1, the storage control device 101 identifies the groups 112-3 and 112-5 from the bit information items 122-3 and 122-5 set to ON.

Next, the storage control device 101 reads data stored at LBAs included in the identified group, as indicated by (2) in FIG. 1. In the example illustrated in FIG. 1, the storage control device 101 reads data stored at all LBAs included in the group 112-3 and data stored at all LBAs included in the group 112-5.

Then, the storage control device 101 identifies the defective sector of the identified group 112 based on the results of reading the data stored from the LBAs included in the identified group 112, as indicated by (3) in FIG. 1. In the example illustrated in FIG. 1, when data is read from the LBA 1002 during a process of reading data from all sectors included in the group 112-3, a defective sector flag is already set to be valid at the LBA 1002 and an error occurs. The storage control device 101 identifies that the LBA 1002 is a defective sector, based on the error of reading the data from the LBA 1002. Similarly, the storage control device 101 identifies that the LBAs 20XX and 20YY are defective sectors. In (3) illustrated in FIG. 1, if each sector corresponds to multiple LBAs, the storage control device 101 outputs multiple LBAs corresponding to the defective sector of the identified group 112.

Thus, if the storage control device 101 is able to manage up to the maximum number of defective sectors of the volume 111, the size of data to be used to identify the defective sectors may be reduced, compared with a case where LBAs of defective sectors are stored on a single LBA basis. For example, if the amount of data of each of the groups is 1 Mbytes, and all defective sectors of 256 Tbytes that are within each memory device 102 are managed, the size of the data is 32 Mbytes (=256 (Tbytes)/1 (Mbytes)/8 (bits/byte)). In a method of storing LBAs of defective sectors on a single LBA basis under the same conditions, the size of the data is 4 Tbytes. Thus, the method according to the embodiment may reduce the data size, compared with the method of storing LBAs of defective sectors on a single LBA basis.

The example in which the storage control device 101 controls the storage regions of the multiple memory devices 102 and forms the RAID groups is described with reference to FIG. 1, but the embodiment is not limited to this. For example, in the embodiment, the storage control device 101 may control a storage region of a single memory device 102 and provide the storage region of the single memory device 102 to the user.

Figure 2:
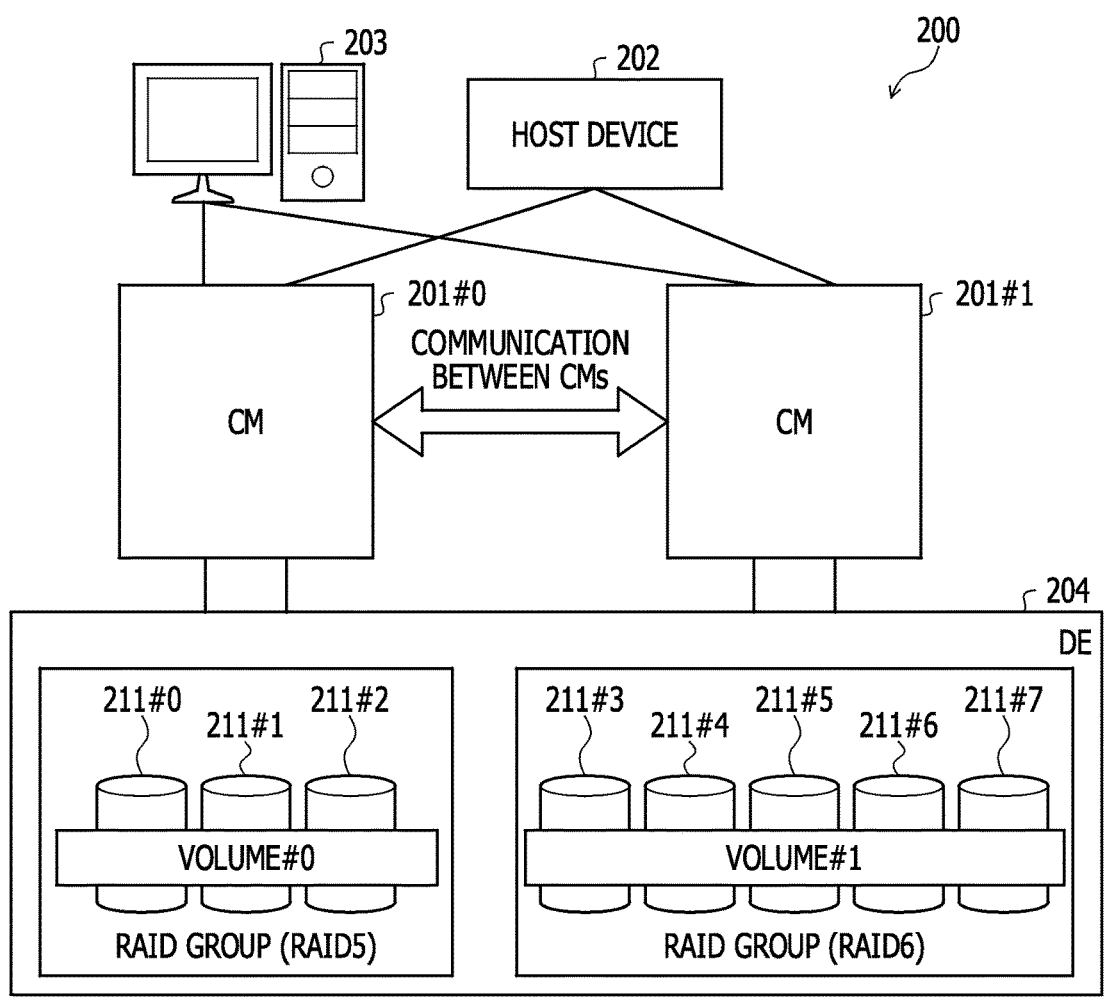
FIG. 2 is an explanatory diagram illustrating an example of the configuration of a storage system 200.

FIG. 2 is an explanatory diagram illustrating an example of the configuration of a storage system 200. The storage system 200 includes controller modules (CMs) 201#0 and 201#1, a host device 202, a personal computer (PC) 203 for device management, and a device enclosure (DE) 204. Each of the CMs 201 corresponds to the storage control device 101 illustrated in FIG. 1.

The CMs 201 are controllers that control disk access. In addition, the CMs 201#0 and 201#1 are coupled to each other by communication between the CMs. As illustrated in the example of FIG. 2, the multiple CMs 201 may be provided and made redundant. Hardware of the insides of the CMs 201 is described with reference to FIG. 3. The host device 202 uses volumes provided by the storage system 200. For example, the host device 202 is a web server or a database (DB) server. The PC 203 for device management is a computer having a web browsing function. Hardware of the PC 203 for device management is described with reference to FIG. 4.

The DE 204 is an enclosure for storing multiple disks 211. Each of the disks 211 corresponds to the memory device 102 illustrated in FIG. 1. In the example illustrated in FIG. 2, the CM 201#0 builds a RAID group of RAID 5 by disks 211#0 to 211#2, and the RAID group of RAID 5 is assigned as a storage region of a volume #0. The CM 201#1 builds a RAID group of RAID 6 by disks 211#3 to 211#7, and the RAID group of RAID 6 is assigned as a storage region of a volume #1. Each of the volumes formed by the RAID groups corresponds to the volume 111 illustrated in FIG. 1. The host device 202 accesses the volumes #0 and #1.

Example of Configurations of CMs 201

Figure 3:
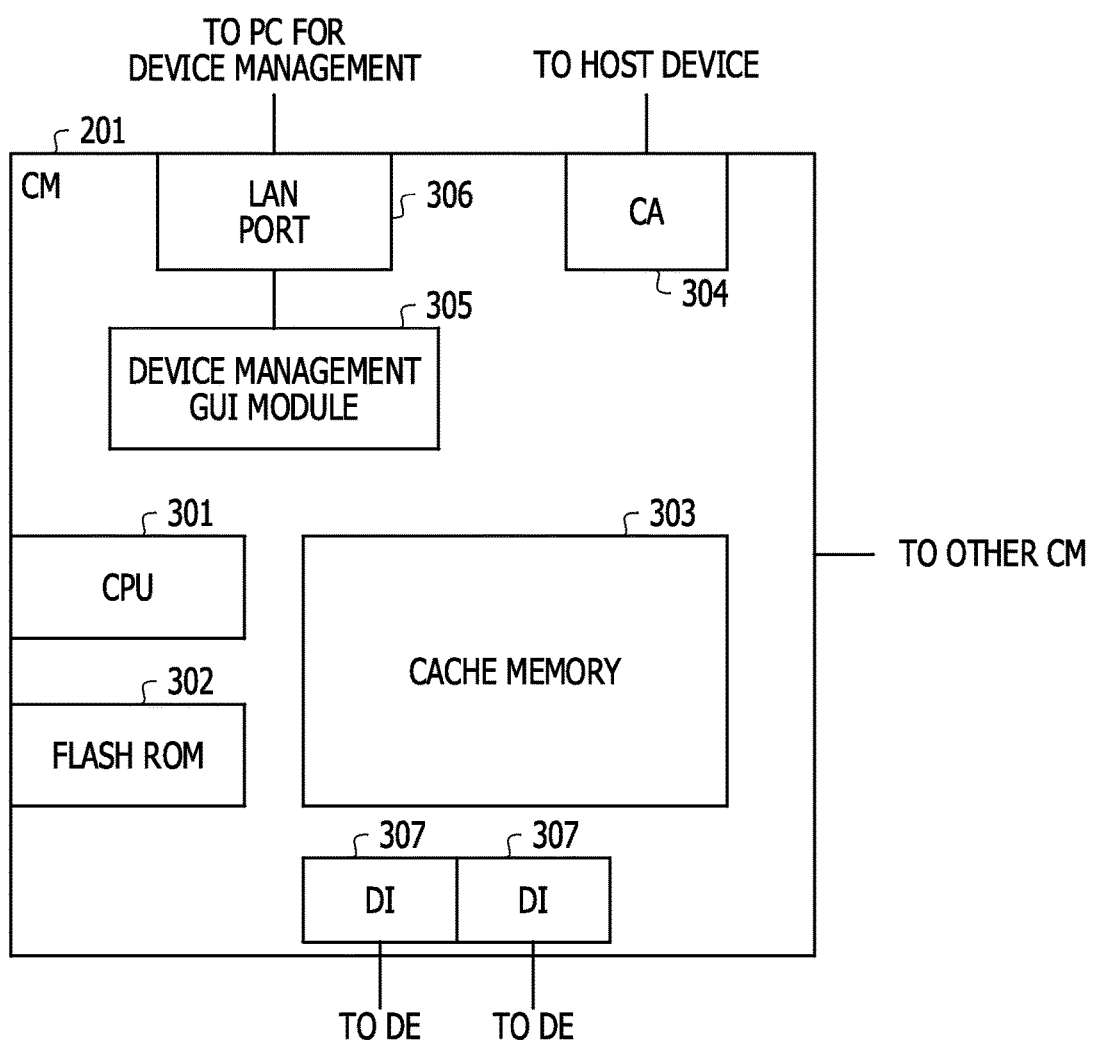
FIG. 3 is an explanatory diagram illustrating an example of each of hardware configurations of CMs 201.

FIG. 3 is an explanatory diagram illustrating an example of a hardware configuration of each of the CMs 201. Each of the CMs 201 includes a central processing unit 301, a flash read only memory (ROM) 302, a cache memory 303, a channel adaptor (CA) 304, a device management graphical user interface (GUI) module 305, a local area network (LAN) port 306, and a disk interface (DI) 307.

The CPU 301 is an arithmetic processing device that controls the overall CM 201. The flash ROM 302 is a nonvolatile memory storing a storage control program according to the embodiment. As a storage medium of the flash ROM 302, a NAND flash memory may be used, for example. The cache memory 303 is a volatile memory that is used as a work area of the CPU 301. The cache memory 303 stores defective sector information including a bit map 121. The defective sector information is described with reference to FIG. 5. Thus, the cache memory 303 corresponds to the bit information storage unit 120 illustrated in FIG. 1. In addition, the cache memory 303 stores the storage control program read from the flash ROM 302.

The CA 304 is a communication interface that communicates with the host device 202. The device management GUI module 305 displays the state of the device in a web browser and provides a management function. The LAN port 306 is a communication interface to be coupled to the PC 203 for device management. The DI 307 is a communication interface that communicates with disks 211.

Example of Hardware Configuration of PC 203 for Device Management

Figure 4:
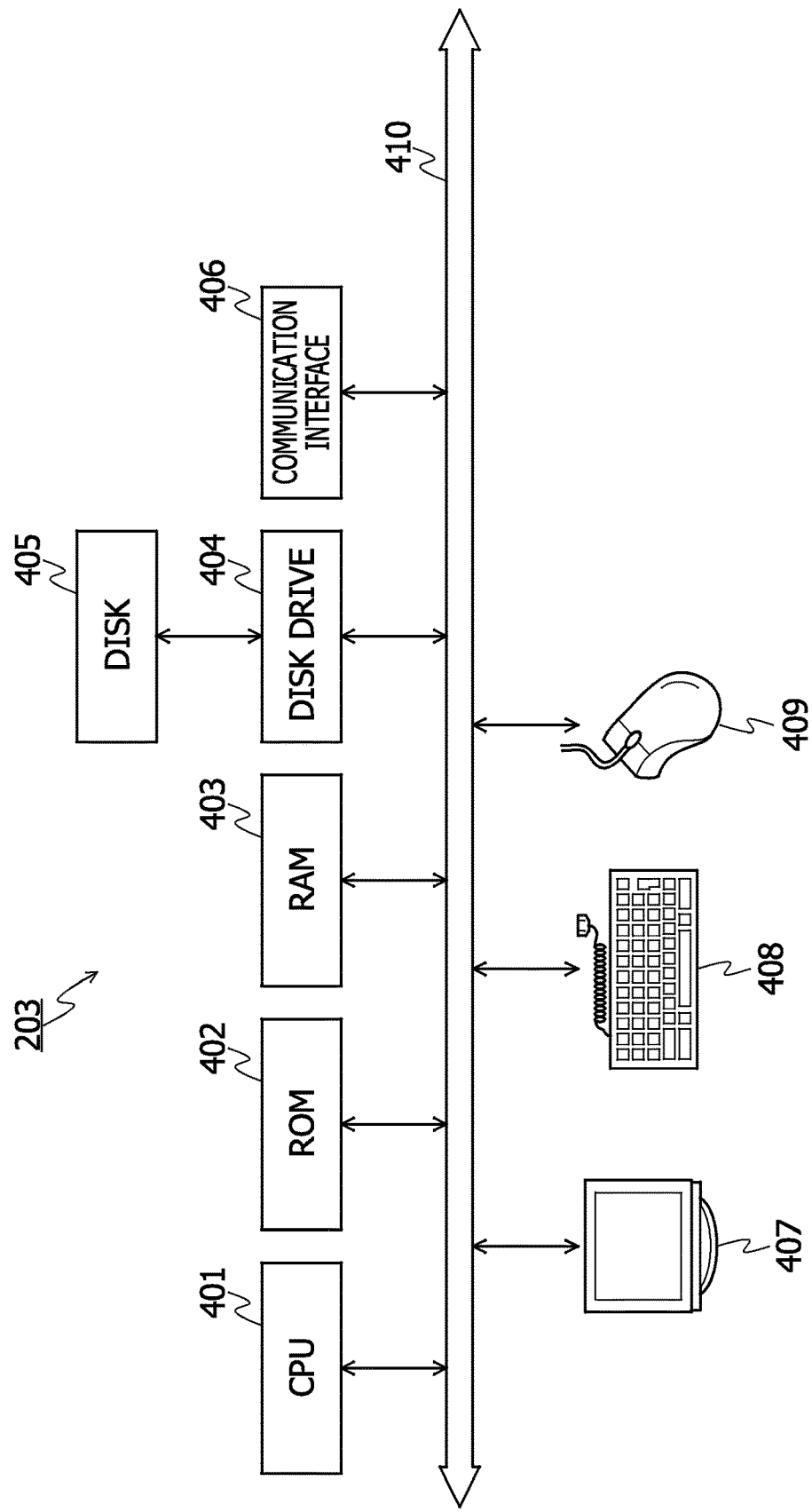
FIG. 4 is an explanatory diagram illustrating an example of a hardware configuration of a PC 203 for device management.

FIG. 4 is an explanatory diagram illustrating an example of a hardware configuration of the PC 203 for device management. The PC 203 for device management includes a CPU 401, a ROM 402, and a random access memory (RAM) 403. In addition, the PC 203 for device management includes a disk drive 404, a disk 405, and a communication interface 406. Furthermore, the PC 203 for device management includes a display 407, a keyboard 408, and a mouse 409. In addition, the CPU 401, the ROM 402, the RAM 403, the disk drive 404, the communication interface 406, the display 407, the keyboard 408, and the mouse 409 are coupled to each other via a bus 410.

The CPU 401 is an arithmetic processing device that controls the overall PC 203 for device management. The ROM 402 is a nonvolatile memory storing programs including a boot program. The RAM 403 is a volatile memory that is used as a work area of the CPU 401.

The disk drive 404 is a control device that controls reading and writing of data from and in the disk 405 in accordance with control by the CPU 401. As the disk drive 404, a magnetic disk drive, an optical disc drive, a solid state drive, or the like may be used. The disk 405 is a nonvolatile memory that stores data written in accordance with control by the disk drive 404. For example, if the disk drive 404 is a magnetic drive, a magnetic disk may be used as the disk 405. If the disk drive 404 is an optical disc drive, an optical disc may be used as the disk 405. If the disk drive 404 is a solid state drive, a semiconductor memory composed of semiconductor elements or a so-called semiconductor disk may be used as the disk 405.

The communication interface 406 is a control device that serves as an interface between a network and the inside of the PC 203 for device management and controls the input and output of data from and to an external device. Specifically, the communication interface 406 is coupled to the other device via a communication line and the network. As the communication interface 406, a modem, a LAN adaptor, or the like may be used, for example.

The display 407 is a device that displays a mouse cursor, icons, tool boxes, and data such as documents, images, and function information. As the display 407, a cathode ray tube (CRT), a thin film transistor (TFT) liquid crystal display, a plasma display, or the like may be used.

The keyboard 408 is a device that has keys to be used to input characters, numbers, various instructions, and the like and inputs data. Alternatively, the keyboard 408 may be a touch-panel type input pad, a numeric keypad, or the like. The mouse 409 is a device that moves the mouse cursor, selects a range, moves a window, changes a size, and the like. The mouse 409 may be replaced with a trackball, a joystick, or the like as long as the trackball, the joystick, or the like functions as a pointing device in the same manner as the mouse 409.

Hardware of the host device 202 includes a CPU, a ROM, a RAM, a disk drive, a disk, and a communication interface. Next, functional configurations of the CMs 201 are described with reference to FIG. 5.

Example of Functional Configurations of CMs 201

Figure 5:
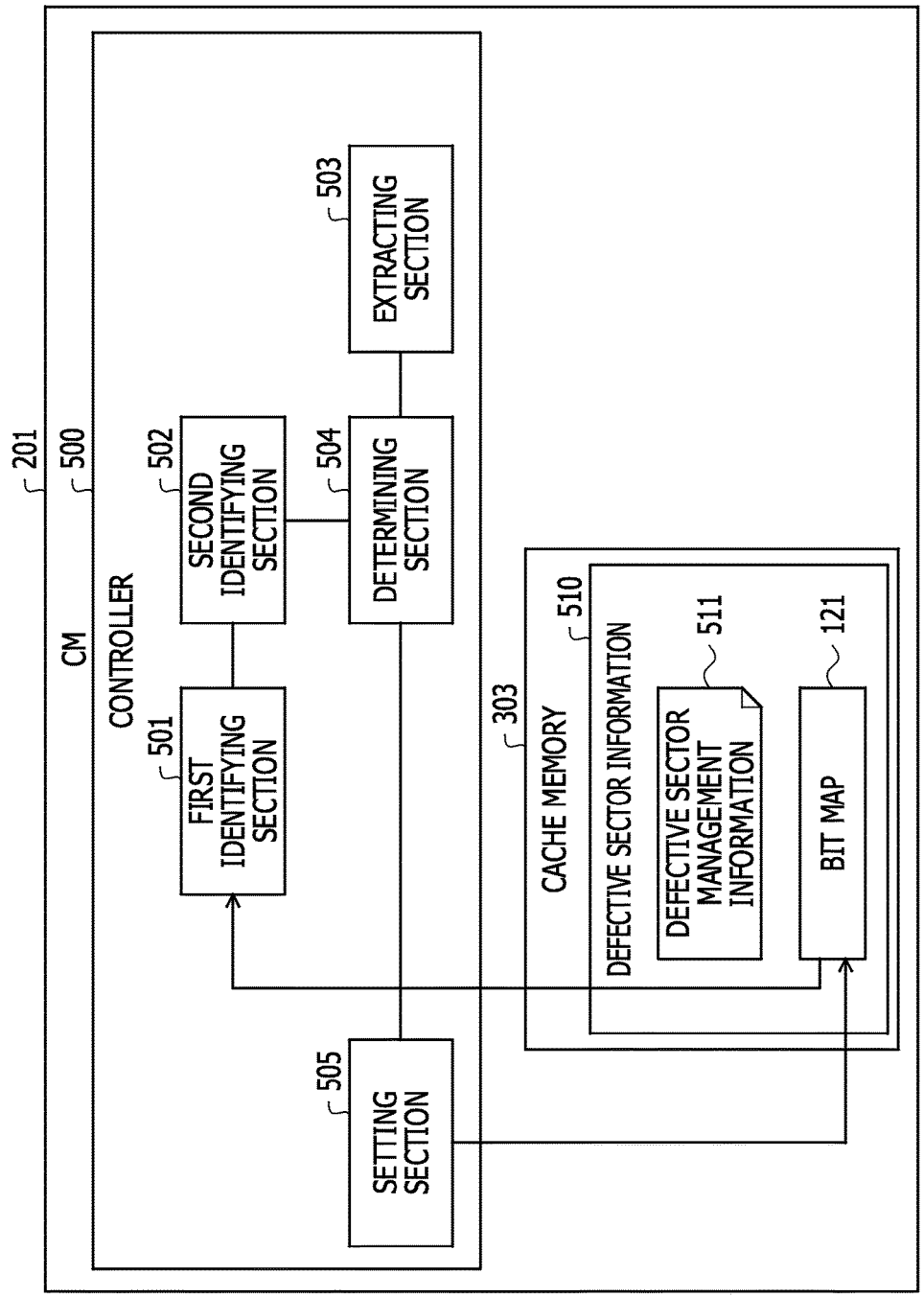
FIG. 5 is an explanatory diagram illustrating an example of each of the functional configurations of the CMs 201.

FIG. 5 is an explanatory diagram illustrating an example of each of the functional configurations of the CMs 201. Each of the CMs 201 includes a controller 500. The controller 500 includes a first identifying section 501, a second identifying section 502, an extracting section 503, a determining section 504, and a setting section 505. The controller 500 achieves functions of the sections when the CPU 301 executes the program stored in a memory device. The memory device is the flash ROM 302 illustrated in FIG. 3 or the like, for example. The results of processes by the sections are stored in a register of the CPU 301, the cache memory 303, or the like.

Figure 8:
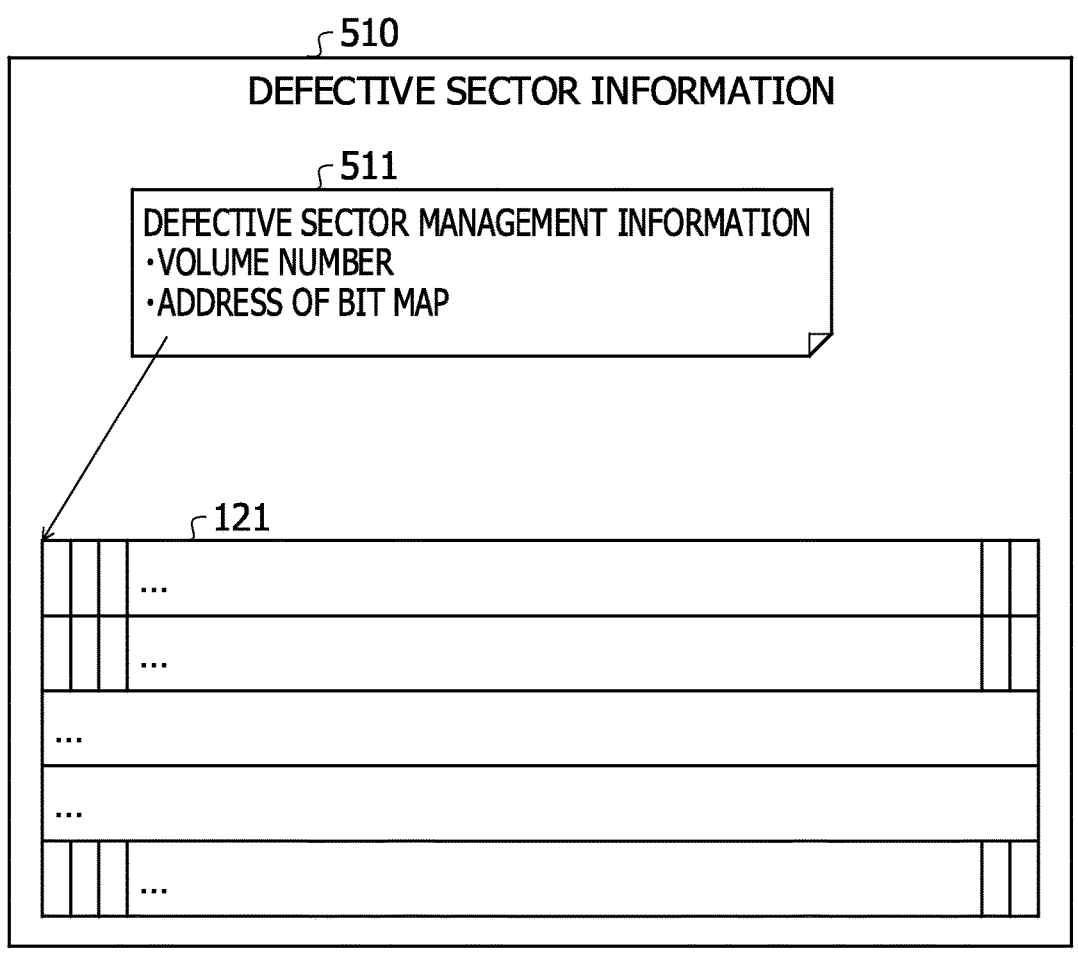
FIG. 8 is an explanatory diagram illustrating an example of stored details of defective section information 510.

In addition, the CM 201 is able to access defective section information 510 included in the cache memory 303. The defective sector information 510 is used to manage LBAs and manage whether or not a defective sector exists on a volume basis. The defective sector information 510 includes defective sector management information 511 and a bit map 121. An example of stored details of the defective sector information 510 is illustrated in FIG. 8.

The first identifying section 501 references the bit map 121 and identifies a group 112 including a defective sector from a volume.

The second identifying section 502 identifies the defective sector included in the group 112 identified by the first identifying section 501, based on the results of reading data from sectors included in the group 112 identified by the first identifying section 501.

Next, a function of setting a bit information item 122 to ON is described. A bit information item 122 is set to ON if an error occurs in reading during the rebuild process, as described with reference to FIG. 1. If an error occurs from any of sectors of the volume, a bit information item 122 associated with a group 112 including the sector is set to ON.

Next, a function of setting a bit information item 122 to OFF is described. A bit information item 122 is set to OFF when writing from the host device 202 is executed. Methods of setting a bit information item 122 to OFF are classified into two. First, the first method is described.

When receiving a write request to execute the writing in the volume, the determining section 504 determines whether or not the sector identified by the second identifying section 502 is included in a range of the writing to be executed in accordance with the write request. In this case, the determining section 504 may determine whether or not all defective sectors identified by the second identifying section 502 are included in the range of the writing. Alternatively, the determining section 504 may identify the minimum and maximum LBAs among LBAs of the defective sectors identified by the second identifying section 502 and determine whether or not the identified minimum LBA is equal to or larger than the minimum value of the range of the writing and whether or not the identified maximum LBA is equal to or smaller than the maximum value of the range of the writing. Next, if the determining section 504 determines that the defective sectors identified by the second identifying section 502 are included in the range of the writing, the setting section 505 sets, to OFF, a bit information item 122 associated with a group 112 including the defective sectors identified by the second identifying section 502.

For example, it is assumed that the group 112-1 has LBAs 0 to 9 and that the group 112-2 has LBAs 10 to 19. In addition, it is assumed that LBAs of the range of the writing are LBAs 5 to 15 and that the defective sectors identified by the second identifying section 502 are LBAs 7 and 12. In this case, the determining section 504 determines that the defective sectors identified by the second identifying section 502 are included in the range of the writing to be executed in accordance with the write request. Then, the setting section 505 sets, to OFF, the bit information items 122-1 and 122-2 associated with the groups 112-1 and 112-2.

Next, the second method for the function of setting a bit information item 122 to OFF is described. When receiving a write request to execute the writing in the volume, the extracting section 503 extracts a group 112 associated with a bit information item 122 set to ON from groups 112 including sectors included in the range of the writing to be executed in accordance with the write request. Next, the determining section 504 determines whether or not a defective sector identified by the second identifying section 502 and included in the group extracted by the extracting section 503 is included in the range of the writing to be executed in accordance with the write request. Then, if the group that includes the defective sector identified by the second identifying section 502 and determined to be included in the range of the writing exists, the setting section 505 sets a bit associated with the group 112 to OFF.

For example, it is assumed that the group 112-1 has the LBAs 0 to 9 and that the group 112-2 has the LBAs 10 to 19. In addition, it is assumed that the group 112-3 has LBAs 20 to 29. It is assumed that the bit information items 122-1, 122-2, and 122-3 associated with the groups 112-1, 112-2, and 112-3 are set to ON. In addition, it is assumed that LBAs of the range of the writing are the LBAs 5 to 25 and that defective sectors identified by the second identifying section 502 are the LBAs 2, 12, and 28.

In this case, the extracting section 503 extracts the groups 122-1, 122-2 and 122-3. Next, the determining section 504 determines that the LBA 2 of the defective sector included in the group 112-1 is not included in the range of the writing. In addition, the determining section 504 determines that the LBA 12 of the defective sector included in the group 112-2 is included in the range of the writing. Furthermore, the determining section 504 determines that the LBA 28 of the defective sector included in the group 112-3 is not included in the range of the writing. Then, the setting section 505 sets the bit information item 122-2 associated with the group 122-2 to OFF.

Example of Rebuild Process

FIG. 6 is an explanatory diagram illustrating an example of the creation of a defective sector in the rebuild process. FIG. 6 assumes that disks 211#x and 211#y included in the DE 204 form a RAID group of RAID 1. In addition, a disk 211#z included in the DE 204 exists as a hot spare disk for the disks 211#x and 211#y.

In the example illustrated in FIG. 6, since the disk 211#y fails, the CM 201 restores data stored in the disk 211#x to the disk 211#z and recovers the redundancy. Specifically, in the example illustrated in FIG. 6, since the disk 211#y belongs to the RAID group of RAID 1, the CM 201 reads the data from the disk 211#x forming a pair with the disk 211#y and writes the read data in the disk 211#z.

The example illustrated in FIG. 6 assumes that the CM 201 fails to read the data from the disk 211#x due to a medium error at a certain LBA. In this case, the CM 201 sets a defective sector flag of the defective sector of the disk 211#x to be valid and sets, to be valid, a defective sector flag of a sector to which data is to be written from the sector on which the reading failed to be executed on the disk 211#x is set to be valid. In addition, since the data of the defective sector was lost, the data stored at the LBA at which the reading failed to be executed is initialized to 0. Specific data structures of the sectors are described with reference to FIG. 7. In the example illustrated in FIG. 6, defective sectors are indicated by symbols x.

FIG. 7 is an explanatory diagram illustrating an example of each of defective sector flags provided in the sectors. FIG. 7 describes an example of a defective sector flag provided in a sector using a data structure of the sector.

A storage region 700 identified by a single LBA of a single sector is a storage region of 520 bytes. In the storage region 700, the storage capacity of a storage region 701 storing data is 512 bytes, and the storage capacity of a storage region 702 storing a check code is 8 bytes.

In the storage region 702, the storage capacity of a storage region 703 storing a cyclic redundancy check (CRC) is 2 bytes, and the storage capacity of a storage region 704 storing a block ID is 6 bytes.

In the storage region 704, the storage capacity of a storage region 705 storing a defective sector flag is 1 bit, and the storage capacity of a storage region 706 storing a value generated based on a logical unit number (LUN) and a part of the LBA is 47 bits.

FIG. 8 is an explanatory diagram illustrating an example of stored details of the defective sector information 510. The defective sector management information 511 included in the defective sector information 510 is information storing a volume number and an address of the bit map 121. The volume number is a number identifying a volume formed by a RAID group. The address of the bit map 121 is a top address of a region in which the bit map 121 is ensured.

The bit map 121 included in the defective sector information 510 is an array of bit information items 122 indicating whether or not a defective sector is included in groups 112.

Next, processes that are indicated as flowcharts and to be executed by each of the CMs 201 are described with reference to FIGS. 9 to 12.

Figure 9:
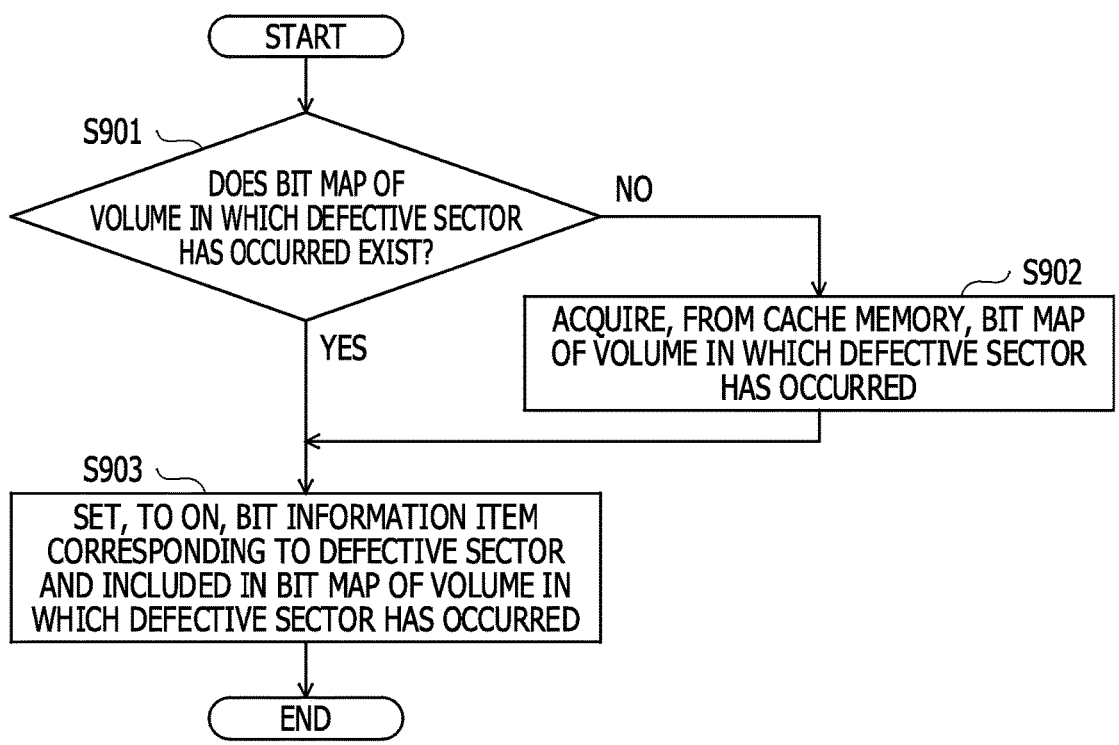
FIG. 9 is a flowchart of an example of a procedure for a process of registering defective sector information.

FIG. 9 is a flowchart of an example of a procedure for a process of registering defective sector information. The process of registering defective sector information is executed when a defective sector from which data is not read due to a medium error or the like during the rebuild process is detected.

The CM 201 determines whether or not a bit map 121 of a volume in which a defective sector has occurred exists (in step S901). If the bit map 121 of the volume in which the defective sector has occurred does not exist (No in step S901), the CM 201 acquires, from the cache memory 303, the bit map 121 of the volume in which the defective sector has occurred exists (in step S902).

After the termination of the process of step S902 or when the bit map 121 of the volume in which the defective sector has occurred already exists (Yes in step S901), the CM 201 sets, to ON, a bit information item 122 corresponding to the defective sector and included in the bit map 121 of the volume in which the defective sector has occurred (in step S903). Then, the CM 201 terminates the process of registering defective sector information.

Figure 10:
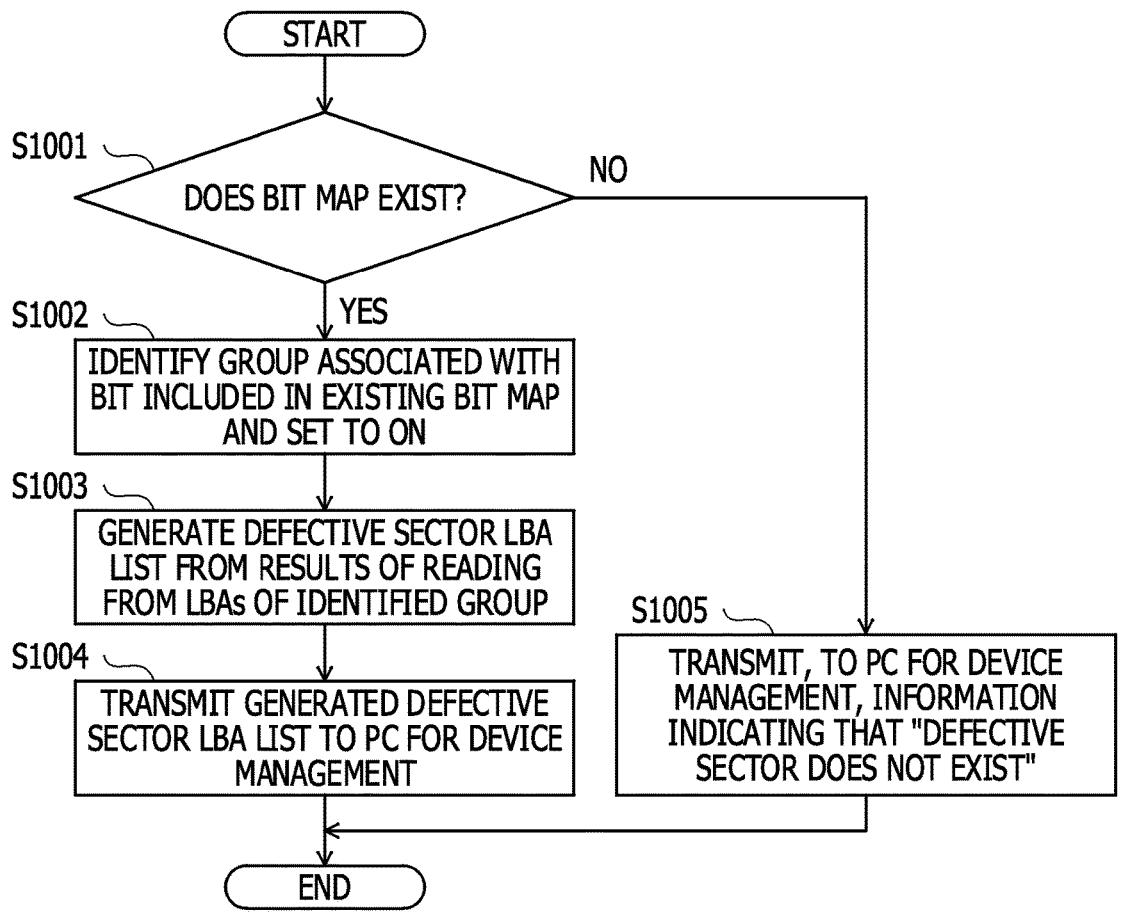
FIG. 10 is a flowchart of an example of a procedure for a process of referencing a defective sector list.

FIG. 10 is a flowchart of an example of a procedure for a process of referencing the defective sector list. The process of referencing the defective sector list is executed when a CM 201 receives a request to transmit the defective sector list from the PC 203 for device management.

The CM 201 determines whether or not a bit map 121 exists (in step S1001). For example, if a target volume number is included in a request to reference the defective sector information, the CM 201 searches defective sector management information 511 in which the target volume number is set. Then, if a valid address is set as the address of the bit map 121 of the defective sector management information 511 found in the search, the CM 201 determines that the bit map 121 exists.

If the bit map 121 exists (Yes in step S1001), the CM 201 identifies a group 112 associated with a bit included in the existing bit map 121 and set to ON (in step S1002).

Next, the CM 201 generates a defective sector LBA list from the results of reading from LBAs of the identified group 112 (in step S1003). Then, the CM 201 transmits the generated defective sector LBA list to the PC 203 for device management (in step S1004). The defective sector LBA list includes a list of LBAs of defective sectors, for example. In addition, the CM 201 may generate, based on the defective sector LBA list, a web page for displaying the LBAs of the defective sectors and transmit the generated web page to the PC 203 for device management, for example. The PC 203 for device management displays the received defective sector LBA list and the received web page on the display 407.

On the other hand, if the bit map 121 does not exist (No in step S1001), the CM 201 transmits, to the PC 203 for device management, information indicating that "a defective sector does not exist" (in step S1005). Like step S1004, the PC 203 for device management displays, on the display 407, the information indicating that "a defective sector does not exist". After the termination of the process of step S1004 or the termination of the process of step S1005, the CM 201 terminates the process of referencing the defective sector list.

Figure 11:
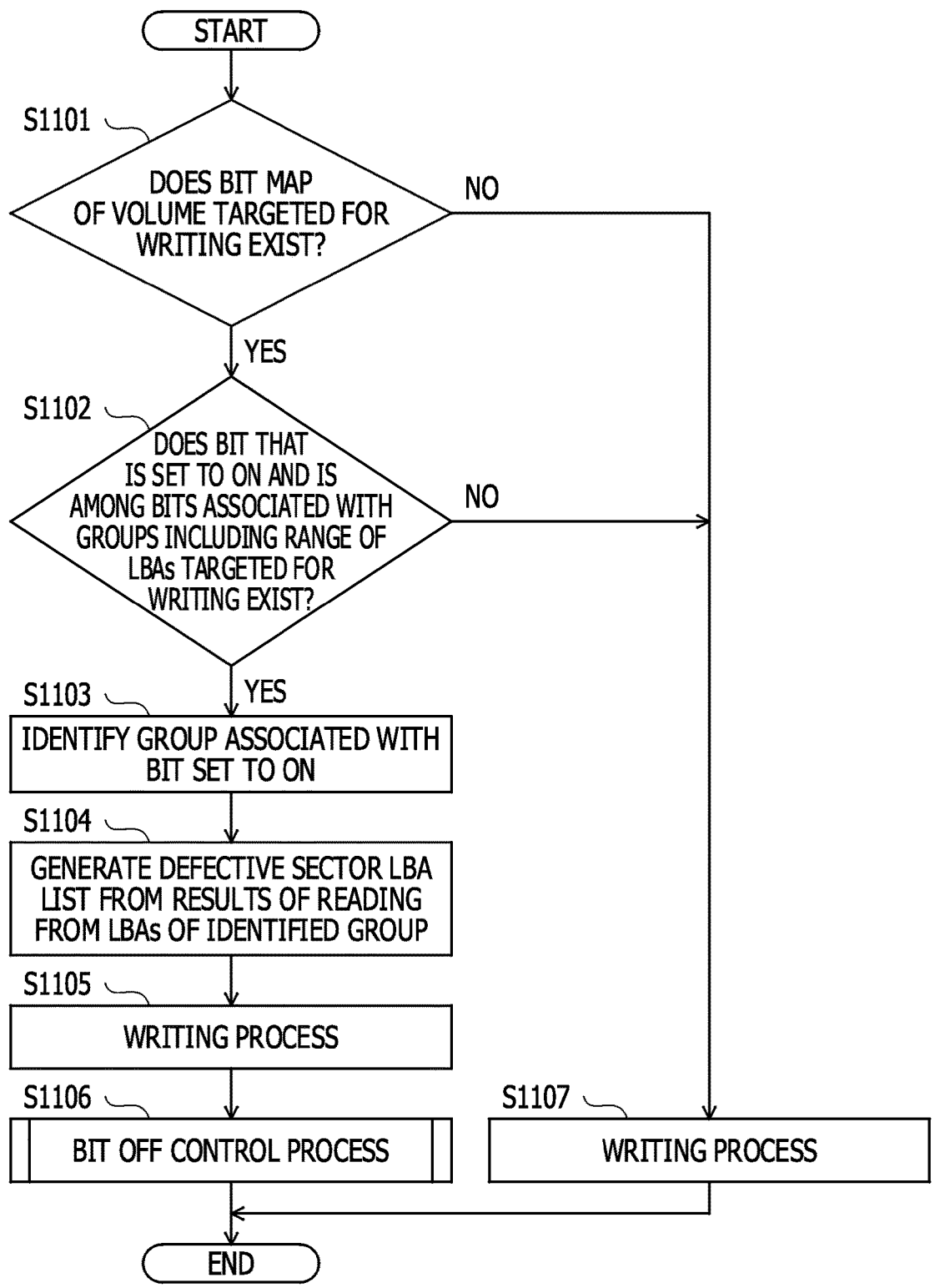
FIG. 11 is a flowchart of an example of a procedure for a process of writing from a host device 202.

FIG. 11 is a flowchart of an example of a procedure for a process of the writing from the host device 202. The process of the writing from the host device 202 is executed when a CM 201 receives a write request from the host device 202.

The CM 201 determines whether or not a bit map 121 of a volume targeted for the writing exists (in step S1101). If the bit map 121 of the volume targeted for the writing exists (Yes in step S1101), the CM 201 references the existing bit map 121 and determines whether or not a bit that is set to ON and is among bits associated with groups 112 including a range of LBAs targeted for the writing exists (in step S1102).

If the bit set to ON exists (Yes in step S1102), the CM 201 identifies a group 112 associated with the bit set to ON (in step S1103). Then, the CM 201 generates a defective sector LBA list from the results of reading from LBAs of the identified group 112 (in step S1104). Next, the CM 201 executes a writing process on the volume targeted for the writing (in step S1105). Then, the CM 201 executes a bit off control process (in step S1106). The bit off control process is described with reference to FIG. 12.

On the other hand, if the bit map of the volume targeted for the writing does not exist (No in step S1101) or if the bit set to ON does not exist (No in step S1102), the CM 201 executes the writing process on the volume targeted for the writing (in step S1107). After the termination of the process of step S1106 or the termination of the process of step S1107, the CM 201 terminates the process of the writing from the host device 202.

In a process of reading from the host device 202, the CM 201 only reads data from a volume targeted for the reading and does not use the defective sector management information 511 and the bit map 121. Thus, a description of the reading process is omitted.

Figure 12:
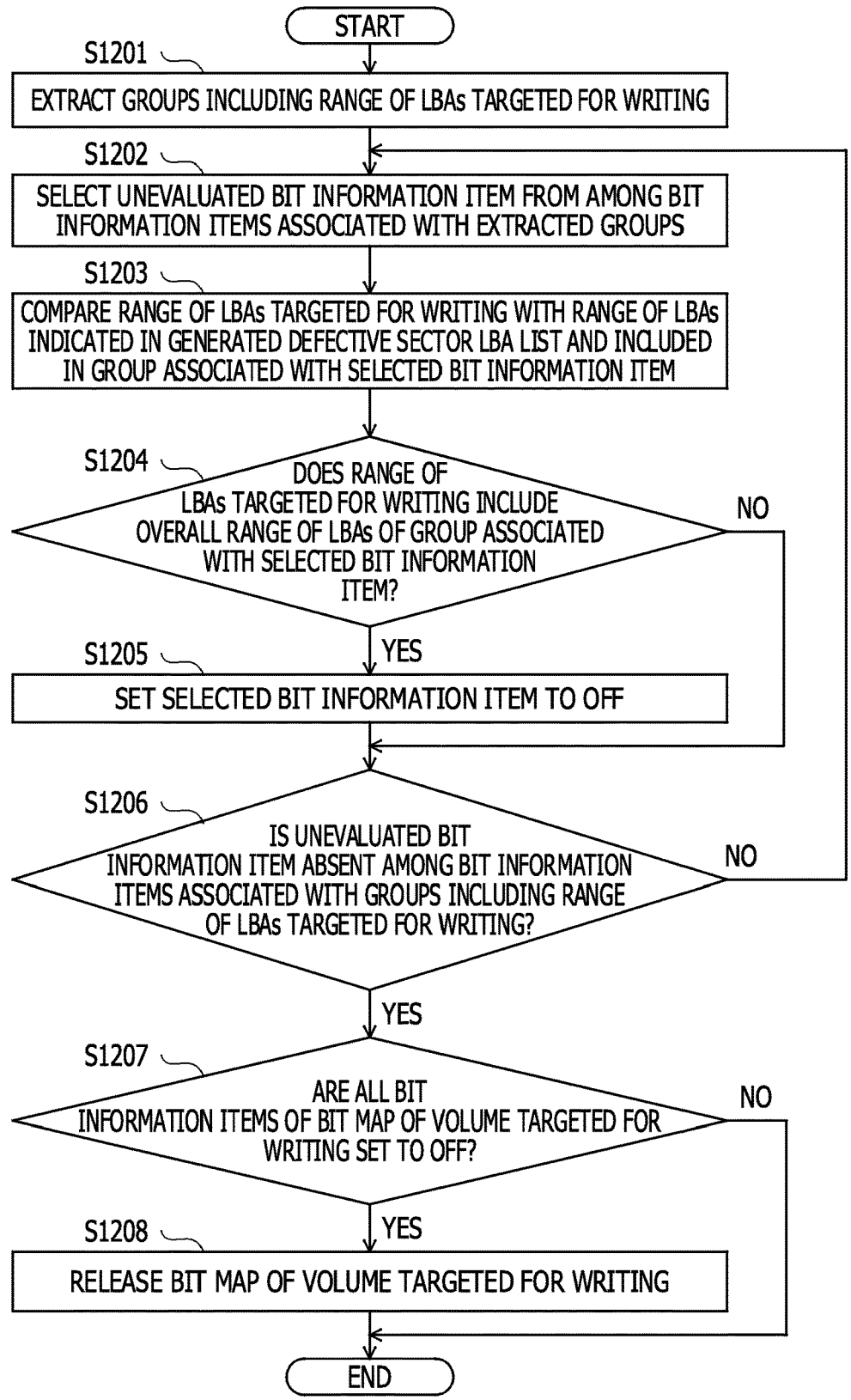
FIG. 12 is a flowchart of an example of a process procedure for bit off control.

FIG. 12 is a flowchart of an example of a procedure for the bit off control process. The bit off control process is a process of setting, to OFF, a bit corresponding to an LBA of a defective sector on which data was overwritten.

The CM 201 extracts, from all groups 112, groups including a range of LBAs targeted for the writing (in step S1201). Then, the CM 201 selects an unevaluated bit information item 122 from among bit information items 122 associated with the groups 112 including the range of the LBAs targeted for the writing (in step S1202). Next, the CM 201 compares the range of the LBAs targeted for the writing with a range of LBAs indicated in the generated defective sector LBA list and included in a group associated with the selected bit (in step S1203). Then, the CM 201 determines whether or not the range of the LBAs targeted for the writing includes the overall range of the LBAs of the group 112 associated with the selected bit information item 122 (in step S1204). If the range of the LBAs targeted for the writing includes the overall range of the LBAs of the group 112 associated with the selected bit information item 122 (Yes in step S1204), the CM 201 sets the selected bit information item 122 to OFF (in step S1205).

After the termination of the process of step S1205, the CM 201 determines whether or not an unevaluated bit information item 122 is absent among the bit information items 122 associated with the groups 112 including the range of the LBAs targeted for the writing (in step S1206). If the range of the LBAs targeted for the writing does not include the overall range of the LBAs of the group 112 associated with the selected bit information item 122 (No in step S1204), the CM 201 executes the process of step S1206. If the unevaluated bit information item 122 exists among the bit information items 122 associated with the groups 112 including the range of the LBAs targeted for the writing (No in step S1206), the CM 201 causes the process to return to step S1202.

On the other hand, if the unevaluated bit information item 122 is absent among the bit information items 122 associated with the groups 112 including the range of the LBAs targeted for the writing (Yes in step S1206), the CM 201 determines whether or not all bit information items 122 of the bit map 121 of the volume targeted for the writing are already set to OFF (in step S1207). If all the bit information items 122 of the bit map 121 of the volume targeted for the writing are already set to OFF (Yes in step S1207), the CM 201 releases the bit map 121 of the volume targeted for the writing (in step S1208).

After the termination of the process of step S1208, if a bit information item 122 that is set to ON and is among the bit information items 122 of the bit map 121 of the volume targeted for the writing exists (No in step S1207), the CM 201 terminates the bit off control process.

The bit off control process is not limited to the process illustrated in FIG. 12. For example, if all LBAs indicated in the generated defective sector LBA list are included in the range of the LBAs targeted for the writing, the CM 201 may set bit information items 122 corresponding to all the LBAs indicated in the generated defective sector LBA list to OFF, instead of the flowchart illustrated in FIG. 12. Then, if all bits of the bit map 121 are set to OFF as a result of setting the bit information items 122 to OFF, the CM 201 releases the bit map 121. Since this process is simpler than the flowchart illustrated in FIG. 12, a load to be applied to the CM 201 may be suppressed, compared with the flowchart illustrated in FIG. 12.

As described above, the CM 201 identifies a group 112 including a defective sector based on the bits indicating whether or not a defective sector is included in the groups 112, and the CM 201 reads the identified group 112 and identifies the defective sector. Each bit is provided for a respective group in the CM 201, and the CM 201 may suppress the data size of the defective sector information 510 to be used to identify a defective sector. Thus, the CM 201 may manage up to the theoretical maximum number of defective sectors existing in the volume on an LBA basis while suppressing the capacity of the cache memory 303.

In addition, if an error occurs in any sector included in a volume, the CM 201 sets a bit information item 122 associated with a group 112 including the sector to ON. Thus, even if the data size of the defective sector information 510 is suppressed, the CM 201 may identify a defective sector from a group 112 associated with a bit information item 122 set to ON and appropriately provide the defective sector list.

In addition, the CM 201 sets, to OFF, a bit information item 122 previously set to ON and associated with a group 112 including an identified defective sector determined to be included in a range of writing to be executed in accordance with a write request. Thus, even if a defective sector is deleted due to overwriting, the CM 201 may match the presence or absence of defective sectors indicated in the defective sector information 510 with the presence or absence of defective sectors included in the volume.

In addition, the CM 201 sets, to OFF, a bit information item 122 associated with a group 112 that is among groups 112 associated with bit information items 122 set to ON and includes an identified defective sector determined to be included in a range of writing to be executed in accordance with a write request. Even if multiple defective sectors are deleted due to overwriting, the CM 201 sets values of bit information items associated with groups 112 including the defective sectors. Thus, even if multiple defective sectors are deleted due to overwriting, the CM 201 may match the presence or absence of defective sectors indicated in the defective sector information 510 with the presence or absence of defective sectors included in the volume.

The storage control method described in the embodiment may be achieved by causing a computer such as a personal computer or a workstation to execute the program prepared in advance. The storage control program is recorded in a computer-readable recording medium such as a hard disk, a flexible disk, a compact disc-read only memory (CD-ROM), or a digital versatile disc (DVD). The storage control program is read from the recording medium by the computer and executed by the computer. The storage control program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device comprising:
a memory; and
a processor coupled to the memory and configured to:
dividing a plurality of storage regions of a storage device into a plurality of groups such that each group includes one or more sectors, each sector being an access unit of the storage device and including one or more storage regions of the plurality of storage regions,
upon detection of an error in reading data from a first storage region of the storage device, determine the first storage region to be an error region at which the error has occurred, and set a first sector including the error region as a defective sector by setting a defective flag in the first sector without storing address information of the first sector into the memory,
store, into the memory, error-flag information associated with each of the plurality of groups and indicating whether the error region is included in each of the plurality of groups,
upon reception of a request to reference information on an error that has occurred in the storage device, identify a first group including the error region, from among the plurality of groups based on the error-flag information that is stored in the memory in association with each of the plurality of groups,
read, from the storage device, the one or more sectors included in the identified first group, and
identify the defective sector and the error region included in the defective sector by detecting the defective flag set in the defective sector of the read one or more sectors.

2. The storage control device according to claim 1, wherein the processor is further configured to:

upon reception of a request to write data into a certain range of the storage device, determine whether the error region is included in the certain range, and change the error-flag information associated with the first group to a value indicating that the error region is not included in the first group when it is determined that the error region is included in the certain range.

3. The storage control device according to claim 1, wherein the processor is further configured to:

upon reception of a request to write data into a certain range of the storage device, identify, from among the plurality of groups, the first group that includes at least a part of the certain range and is associated with the error-flag information set to the value indicating that the error region is included, determine whether the error region included in the identified first group is included in the certain range, and change the error-flag information associated with the first group to a value indicating that the error region is not included in the first group when it is determined that the error region is included in the certain range.

4. The storage control device according to claim 1, wherein the storage device includes memory devices of a Redundant Arrays of Inexpensive Disks (RAID) configuration.

5. A storage system comprising:

a storage device; and a storage control device including a memory and a processor coupled to the memory, wherein the processor is configured to:

divide a plurality of storage regions of the storage device into a plurality of groups such that each group includes one or more sectors, each sector being an access unit of the storage device and including one or more storage regions of the plurality of storage regions, upon detection of an error in reading data from a first storage region of the storage device, determine the first storage region to be an error region at which the error has occurred, and set a first sector including the error region as a defective sector by setting a defective flag in the first sector without storing address information of the first sector into the memory, store, into the memory, error-flag information associated with each of the plurality of groups and indicating whether the error region is included in each of the plurality of groups, upon reception of a request to reference information on an error that has occurred in the storage device, identify a first group including the error region, from among the plurality of groups, based on the error-flag information associated with each of the plurality of groups, read, from the storage device, one or more sectors included in the identified first group, and identify the defective sector and the error region included in the defective sector by detecting the defective flag set in the defective sector of the read one or more sectors.

6. The storage system according to claim 5, wherein the processor is further configured to:

upon reception of a request to write data into a certain range of the storage device, determine whether the error region is included in the certain range, and change the error-flag information associated with the first group to a value indicating that the error region is not included in the first group when it is determined that the error region is included in the certain range.

7. The storage system according to claim 5, wherein the processor is further configured to:

upon reception of a request to write data into a certain range of the storage device, identify, from among the plurality of groups, the first group that includes at least a part of the certain range and is associated with the error-flag information set to the value indicating that the error region is included, determine whether the error region included in the identified first group is included in the certain range, and change the error-flag information associated with the first group to a value indicating that the error region is not included in the first group when it is determined that the error region is included in the certain range.

8. The storage system according to claim 5, wherein the storage device includes memory devices of a Redundant Arrays of Inexpensive Disks (RAID) configuration.

9. A method performed by a processor coupled to a memory comprising:

dividing a plurality of storage regions of a storage device into a plurality of groups such that each group includes one or more sectors, each sector being an access unit of the storage device and including one or more storage regions of the plurality of storage regions, upon detection of an error in reading data from a first storage region of the storage device, determining the first storage region to be an error region at which the error has occurred, and setting a first sector including the error region as a defective sector by setting a defective flag in the first sector without storing address information of the first sector into the memory, storing, into the memory, error-flag information associated with each of the plurality of groups and indicating whether the error region is included in each of the plurality of groups;

upon reception of a request to reference information on an error that has occurred in the storage device, identifying a first group including the error region, from among the plurality of groups, based on the error-flag information associated with each of the plurality of groups;

reading, from the storage device, the one or more sectors included in the identified first group; and identifying the defective sector and the error region included in the defective sector by detecting the defective flag set in the defective sector of the read one or more sectors.

10. The method according to claim 9, further comprising:

upon reception of a request to write data into a certain range of the storage device, determining whether the error region is included in the certain range; and changing the error-flag information associated with the first group to a value indicating that the error region is not included in the first group when it is determined that the error region is included in the certain range.

11. The method according to claim 9, further comprising:

upon reception of a request to write data into a certain range of the storage device, identifying, from among the plurality of groups, the first group that includes at least a part of the certain range and is associated with the error-flag information set to the value indicating that the error region is included;

determining whether the error region included in the identified first group is included in the certain range; and changing the error-flag information associated with the first group to a value indicating that the error region is not included in the first group when it is determined that the error region is included in the certain range.

12. The method according to claim 9, wherein the storage device includes memory devices of a Redundant Arrays of Inexpensive Disks (RAID) configuration.

* * * * *